Patented Dec. 5, 1939

2,181,893

UNITED STATES PATENT OFFICE 2,181,893

SYNTHETIC RESINS

Horace H. Hopkins, Ridley Park, Pa., and Frank A. McDermott, Claymont, Del., assignors to E. I. du Pont de Nemours & Company, Wilmington, Del., a corporation of Delaware No Drawing. Application July 26, 1930, Serial No. 471,083. Renewed August 16, 1938

4 Claims. (Cl. 260—22)

This invention relates to the art of synthetic resins and more particularly to polyhydric alcohol-polybasic acid resins.

This application is in part a continuation of our application Serial No. 178,135, filed March 24, 1927.

Polyhydric alcohol-polybasic acid resins modified with China-wood oil or China-wood oil acids have been previously known but such products are characterized by relatively high viscosities in solution, high acid numbers, and the property of "frosting" or "crinkling" on drying. On the other hand, resins modified by equivalent proportions of linseed oil are characterized by the fact that their films are slower drying, have longer residual tack and are softer. We have discovered that the use of mixtures of China-wood oil or China-wood oil acids and other drying oils or drying oil acids as modifying ingredients produces resins whose films possess exceptionally fast drying properties and which dry hard without the frosting failure which frequently characterizes resins containing China-wood oil or China-wood oil acids alone. Such resins are also lower in viscosity and acid number and possess greater solubility than can be obtained in resins of comparable oil length without the accompanying use of other drying oils or drying oil acids.

By the term "modified polyhydric alcohol-polybasic acid resin", as used herein, we mean the resinous condensation product resulting from the reaction of one or more polyhydric alcohols, one or more polybasic acids and at least one of the following combinations: a mixture of drying oils including China-wood oil, a mixture of drying oil acids including China-wood oil acids, a mixture of drying oils and drying oil acids including China-wood oil or China-wood oil acids, with or without one or more additional modifying ingredients.

We have discovered that modified polyhydric alcohol-polybasic acid resins of the type indicated hereinafter possess a combination of properties which make them new and useful.

More specifically, we have discovered that by using a mixture of drying oils, a mixture of drying oil acids, or a mixture containing drying oils and drying oil acids as modifying ingredients of polyhydric alcohol-polybasic acid resins it is possible, where China-wood oil or China-wood oil acids are a part of the above mentioned ingredients, to produce flexible resins which yield faster drying and harder films than have been heretofore available and which do not possess the objectionable characteristics often associated with the use of China-wood oil or China-wood oil acids as a modifying agent.

It is therefore an object of this invention to produce new and useful modified polyhydric alcohol-polybasic acid resins.

It is another object to produce modified polyhydric alcohol-polybasic acid resins which produce films that dry more rapidly and harder than has heretofore been possible with prior resins containing China-wood oil or China-wood oil acids as the modifying agent.

With the above and other objects in view, which will be apparent as the description proceeds, we have set forth our invention in the following specification and have included the following examples by way of illustration and not as a limitation.

Example 1

| | Parts by weight |
|---|---|
| Glycerol | 14.8 |
| Phthalic anhydride | 19.5 |
| Linseed oil acids | 43.8 |
| China-wood oil acids | 21.9 |
| Total | 100.0 |

Example 2

| | Parts by weight |
|---|---|
| Glycerol | 17.3 |
| Phthalic anhydride | 27.3 |
| Linseed oil acids | 27.7 |
| China-wood oil acids | 27.7 |
| Total | 100.0 |

Example 3

| | Parts by weight |
|---|---|
| Glycerol | 17.3 |
| Phthalic anhydride | 27.2 |
| Linseed oil acids | 44.4 |
| China-wood oil acids | 11.1 |
| Total | 100.0 |

Example 4

| | Parts by weight |
|---|---|
| Glycerol | 25 |
| Phthalic anhydride | 50 |
| Linseed oil acids | 12.5 |
| China-wood oil acids | 12.5 |
| Total | 100.0 |

Example 5

| | Parts by weight |
|---|---|
| Glycerol | 23.1 |
| Phthalic anhydride | 46.1 |
| China-wood oil | 15.4 |
| Linseed oil acids | 15.4 |
| Total | 100.0 |

Example 6

| | Parts by weight |
|---|---|
| Glycerol | 19.1 |
| Phthalic anhydride | 39.55 |
| China-wood oil | 13.85 |
| Linseed oil acids | 27.5 |
| Total | 100.00 |

The polyhydric alcohol-polybasic acid resins referred to above may be made in any well known manner, as, for example, by heating the ingredients at any suitable temperature above the melting point of the materials until resinification is complete. In the preparation of resins of unusually light color, it has been found preferable to carry out the reaction in the presence of an inert gas. If desired, refluxing or partial refluxing may be resorted to or the operation may be carried out at elevated or reduced pressures.

Where oil is used in place of oil acids, it is desirable, in order to obtain a homogeneous product, to heat the oil and alcohol together before adding the phthalic anhydride. Other modifying ingredients, if used, may be added in either stage.

In general, it is advisable to maintain the acid number of the resin at the lowest possible value, and this is usually accomplished by increasing the temperature or the period of heating but stopping before the gel point is reached.

In certain cases, in which an extremely low acid number is unnecessary, the heating is stopped when a low enough acid number is obtained, in order to avoid unduly increasing the viscosity of the resin.

For most purposes, and this is true for the above examples, we have found it to be satisfactory to heat the ingredients at 180° to 250° C. for 5 to 10 hours. Where the ingredients include a large percentage of China-wood oil or China-wood oil acids, it is advisable to keep the heating down to 200° to 225° C. to avoid premature gelation of the resin.

Although the above examples have been limited to modified glyceryl phthalate resins, we desire to have it understood that other polyhydric alcohols, such as glycol, may be substituted in whole or in part for the glycerol, and other polybasic acids, such as succinic, may be substituted at least in part for the phthalic anhydride. In general, the complete substitution of an aliphatic polybasic acid for phthalic anhydride is less satisfactory, although this can be accomplished by varying the proportions of the ingredients used. While linseed oil or linseed oil acids have been used in the above examples, as oils which are characterized by the absence of tendencies to frost and gel as compared with China-wood oil, which does possess these properties, we desire to have it understood that other non-frosting and non-gelling type drying oils, and oil acids derived from such oils, such as perilla oil, or perilla oil acids, may be substituted in whole or in part for the linseed oil or linseed oil acids.

We also desire to have it understood that while the relative proportions of China-wood oil and linseed oil, or the corresponding acids, are those indicated by the above examples, these proportions may be varied over rather wide limits. In general, however, the percentage of China-wood oil or China-wood oil acids of the total oil or oil acids should not exceed about 60%, but may be as low as about 10%.

It will therefore be apparent that by following the teaching of the present invention it is possible to produce modified polyhydric alcohol-polybasic acid resins which possess the desired properties of imparting rapid and hard drying to the resulting films without encountering the objectionable frosting and crinkling which have heretofore characterized China-wood oil or China-wood oil acids modified polyhydric alcohol-polybasic acid resins.

Similarly, the resins falling within the scope of the present invention are useful for a wide range of coating compositions, such as paints, enamels, varnishes and lacquers, as well as for impregnating compositions, insulating compositions and adhesives.

As many apparently widely different embodiments of this invention may be made without departing from the spirit and scope thereof, it is to be understood that we do not limit ourselves to the specific embodiments thereof except as defined in the appended patent claims.

We claim:

1. The process of producing modified polyhydric alcohol-polybasic acid resins that are clear and homogeneous and form rapid and hard drying films which comprises heating glycerol, phthalic anhydride, linseed oil acids and China-wood oil, the China-wood oil constituting between 10% and 60% of the combined linseed oil acids and China-wood oil content.

2. A modified polyhydric alcohol-polybasic acid resin formed by the reaction of glycerol, phthalic anhydride, linseed oil acids and China-wood oil, the China-wood oil constituting between 10% and 60% of the combined linseed oil acids and China-wood oil content, and said resin being clear and homogeneous.

3. The process of producing modified polyhydric alcohol-polybasic acid resins that are clear and homogeneous and form rapid and hard drying films which comprises heating a polyhydric alcohol, a polybasic polycarboxylic acid, linseed oil acids and China-wood oil, the China-wood oil constituting between 10% and 60% of the combined linseed oil acids and China-wood oil content.

4. A modified polyhydric alcohol-polybasic acid resin formed by the reaction of a polyhydric alcohol, a polybasic polycarboxylic acid, linseed oil acids and China-wood oil, the China-wood oil constituting between 10% and 60% of the combined linseed oil acids and China-wood oil content, and said resin being clear and homogeneous, same being the product of the process of claim 3.

HORACE H. HOPKINS.
FRANK A. McDERMOTT.

CERTIFICATE OF CORRECTION.

Patent No. 2,181,893.                                                              December 5, 1939.

HORACE H. HOPKINS, ET AL.

It is hereby certified that error appears in the printed specification of the above numbered patent requiring correction as follows: Page 2, second column, lines 59 and 66, claims 3 and 4 respectively, strike out "polybasic"; and that the said Letters Patent should be read with this correction therein that the same may conform to the record of the case in the Patent Office.

Signed and sealed this 16th day of January, A. D. 1940.

Henry Van Arsdale,
                                                            Acting Commissioner of Patents.

(Seal)